United States Patent
Lai (10) Patent No.: US 8,346,236 B2
(45) Date of Patent: Jan. 1, 2013

(54) METHOD FOR SWITCHING CALL MODE OF A MOBILE DEVICE AND RELATED MOBILE DEVICE CAPABLE OF SWITCHING CALL MODE AUTOMATICALLY

(75) Inventor: Yu-Peng Lai, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 180 days.

(21) Appl. No.: 12/793,674

(22) Filed: Jun. 3, 2010

(65) Prior Publication Data

US 2010/0311465 A1 Dec. 9, 2010

(30) Foreign Application Priority Data

Jun. 5, 2009 (TW) .............................. 98118690 A (51) Int. Cl.
*H04M 3/00* (2006.01)
(52) U.S. Cl. ..... 455/418; 455/421; 455/420; 455/550.1; 455/569.1
(58) Field of Classification Search .............. 455/569.1, 455/569.2, 575.3, 575.4, 550.1; 379/432, 379/420.1, 420.2
See application file for complete search history.

(56) References Cited

U.S. PATENT DOCUMENTS

| 6,411,828 | B1 | 6/2002 | Lands |
| 6,751,446 | B1 | 6/2004 | Kim |
| 6,799,062 | B1 * | 9/2004 | Piket et al. ................. 455/569.1 |
| 7,103,395 | B2 | 9/2006 | Mori |
| 7,263,373 | B2 * | 8/2007 | Mattisson ................. 455/456.3 |
| 8,122,491 | B2 * | 2/2012 | Yee et al. ........................... 726/9 |
| 2006/0019714 | A1 | 1/2006 | Lee |
| 2007/0293188 | A1 | 12/2007 | Houghton |
| 2009/0209293 | A1 * | 8/2009 | Louch .......................... 455/566 |

FOREIGN PATENT DOCUMENTS

| AU | 3515393 A | 10/1993 |
| CN | 1725767 A | 1/2006 |
| CN | 101425213 A | 5/2009 |
| TW | 200731743 | 8/2007 |

OTHER PUBLICATIONS

Office action mailed on Jul. 3, 2012 for the China application No. 200910146893.X, filing date Jun. 19, 2009, p. 1-7.

* cited by examiner

*Primary Examiner* — Kathy Wang-Hurst
(74) *Attorney, Agent, or Firm* — Winston Hsu; Scott Margo (57) ABSTRACT

A method for switching a call mode of a mobile device includes the steps of starting an accelerometer sensor to detect an acceleration of the mobile device, starting a proximity sensor to detect a distance between the mobile device and an object, generating a first judgment result according to the detected acceleration of the mobile device, generating a second judgment result according to the detected distance between the mobile device and the object, and setting the call mode of the mobile device according to at least the first judgment result and the second judgment result.

17 Claims, 5 Drawing Sheets

METHOD FOR SWITCHING CALL MODE OF A MOBILE DEVICE AND RELATED MOBILE DEVICE CAPABLE OF SWITCHING CALL MODE AUTOMATICALLY

BACKGROUND OF THE INVENTION

1. Field of the Invention

The present invention relates to a method for switching a call mode of a mobile device and a related mobile device capable of switching the call mode automatically, and more particularly, to a method and a mobile device for switching the call mode of the mobile device by using an accelerometer sensor and a proximity sensor.

2. Description of the Prior Art

In the modern information society with flourishing wireless communications, a mobile phone has become one of the most common communication tools. The mobile phone allows users to perform wireless communications anytime and anywhere, and thereby to perform voice communications conveniently. Generally speaking, the users can perform wireless communications by holding the mobile phone with hands. However, there will be inconvenient for the users to hold the mobile device with hands, such as driving or working with two hands. At this time, the users are able to use the "hands-free" feature of the mobile phone for wireless communications.

However, presently the hands-free feature of the mobile device must be implemented by switching the call mode of the mobile device via pressing a button or operating a software. Hence, if the user suddenly wants to turn off the hands-free feature to switch the mobile device into the receiver mode during the period the hands-free feature is in the use, the user must press the button (or operate the software) to complete switching the call mode. On the other hand, a speaker is usually used for providing larger output power consumption when the hands-free feature is in the use. An ideal hands-free feature should be able to automatically adjust the output volume of the mobile phone. That is, when the user is closer to the mobile phone, the volume of the mobile phone gets smaller; and when the user is farther away from the mobile phone, the volume of the mobile phone gets larger. In the prior art, the user can adjust the output volume of the speaker only by adjusting the volume buttons, which causes inconvenience in use. In addition, it will injure the human ear caused by a sudden large volume when the user suddenly gets the mobile device around the human ear under the speaker mode.

Therefore, how to improve convenience of the mobile phone, and increase more additional features to the mobile phone become important topics in this field.

SUMMARY OF THE INVENTION

The present disclosure provides a method for switching a call mode of a mobile device and a mobile device capable of switching the call mode automatically to solve the abovementioned problems.

According to one embodiment, a method for switching a call mode of a mobile device is provided. The method includes the steps of: starting an accelerometer sensor to detect an acceleration of the mobile device; starting a proximity sensor to detect a distance between the mobile device and an object; generating a first judgment result according to the detected acceleration of the mobile device; generating a second judgment result according to the detected distance between the mobile device and the object; and setting the call mode of the mobile device according to at least the first judgment result and the second judgment result. In one embodiment of the present invention, the call mode of the mobile device includes a speaker mode and a receiver mode, and the accelerometer sensor and the proximity sensor are started when the mobile device has established a call connection.

According to another embodiment, a method for switching a call mode of a mobile device is provided. The method includes the steps of: starting a proximity sensor to detect a distance between the mobile device and an object; when the call mode of the mobile device is a receiver mode, generating a judgment result according to the detected distance between the mobile device and the object; and setting the call mode of the mobile device according to at least the judgment result.

According to another embodiment, a mobile device capable of automatically switching a call mode is provided. The mobile device includes an accelerometer sensor, a proximity sensor, an audio codec, a first sound output device, a second sound output device, a micro-processing unit, and a judgment unit. The accelerometer sensor detects an acceleration of the mobile device. The proximity sensor detects a distance between the mobile device and an object. The audio codec processes an audio signal. The first sound output device is coupled to the audio codec, and the second sound output device is also coupled to the audio codec. The micro-processing unit is coupled to the first sound output device and the second sound output device. The judgment unit is coupled to the accelerometer sensor, the proximity sensor, and the micro-processing unit for generating a first judgment result according to the detected acceleration of the mobile device and for generating a second judgment result according to the detected distance between the mobile device and the object. The micro-processing unit determines to use the first sound output device or the second sound output device to play the audio signal according to at least the first judgment result and the second judgment result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
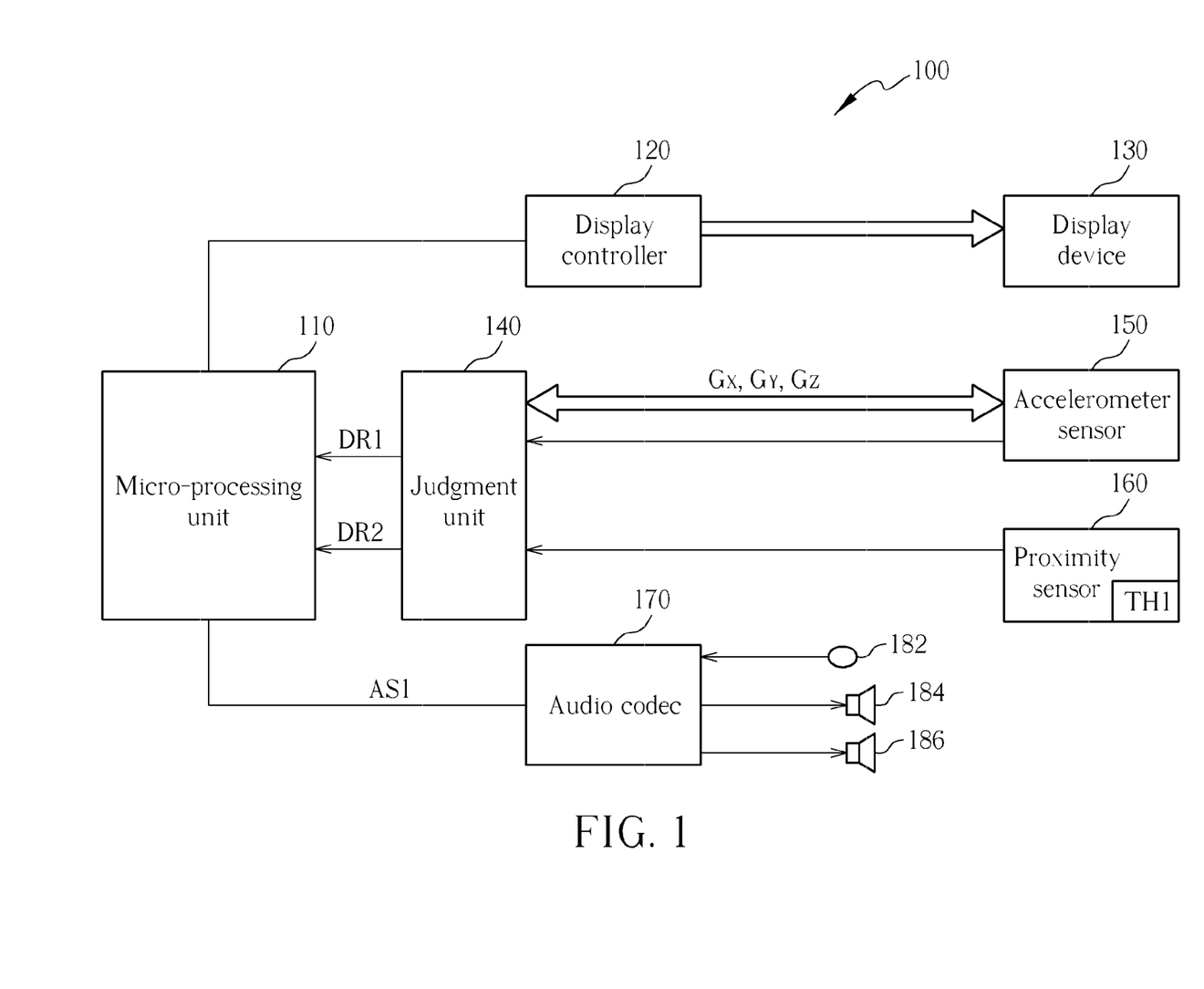
FIG. 1 is a diagram of a mobile device capable of automatically switching a call mode according to a first embodiment of the present disclosure.

Please refer to FIG. 1. FIG. 1 is a diagram of a mobile device 100 capable of automatically switching a call mode according to a first embodiment of the present disclosure. As shown in FIG. 1, the mobile device 100 includes, but is not limited to, a micro-processing unit 110, a display controller 120, a display device 130, a judgment unit 140, an accelerometer sensor 150, a proximity sensor 160, an audio codec 170, a sound input device 182, a first sound output device 184, and a second sound output device 186. The accelerometer sensor 150 is coupled to the judgment unit 140 for detecting an acceleration of the mobile device 100. For example, the mobile device 100 has three acceleration values $G_X$, $G_Y$, and $G_Z$ with different axes. The proximity sensor 160 is coupled to the judgment unit 140 for detecting a distance D between the mobile device 100 and an object, herein the so-called object can be the human face, the human ear, or any object approximating the mobile device 100. In this embodiment, the proximity sensor 160 can detect whether the mobile device 100 approximates an object or the distance D between the mobile device 100 and an object by means of infrared sensors, ultrasonic sensors, thermal sensors or else. The judgment unit 140 is coupled to the accelerometer sensor 150, the proximity sensor 160, and the micro-processing unit 110 for generating a first judgment result DR1 according to the detected acceleration (e.g. $G_X$, $G_Y$, and $G_Z$) of the mobile device 100 and for generating a second judgment result DR2 according to the detected distance D between the mobile device 100 and the object. In this embodiment, the judgment unit 140 can be implemented by hardware or software. The audio codec 170 is used for processing an audio signal AS1. The sound input device 182, the first sound output device 184, and the second sound output device 186 are respectively coupled to the audio codec 170. The micro-processing unit 110 sets the call mode of the mobile device 100 according to at least the first judgment result DR1 and the second judgment result DR2, and determines to use either the first sound output device 184 or the second sound output device 186 to play the audio signal AS1.

Please note that the mobile device 100 can be a mobile phone or a personal digital assistant (PDA). But this should not be considered as limitations of the present invention, and the mobile device 100 can be a mobile device of other types. Moreover, the display device 130 can be an LCD screen, but the present invention is not limited to this. And the display controller 120 is used for controlling operations related to the display device 130.

Please also note that, in this embodiment, the sound input device 182 is a microphone, the first sound output device 184 is a receiver, and the second sound output device 186 is a speaker. The micro-processing unit 110 sets the call mode (e.g. a receiver mode or a speaker mode) of the mobile device 100 according to at least the first judgment result DR1 and the second judgment result DR2. In other words, the micro-processing unit 110 determines to use either the first sound output device 184 (i.e. the receiver) or the second sound output device 186 (i.e. the speaker) to play the audio signal AS1.

Since the accelerometer sensor 150 and the proximity sensor 160 consume power, neither the accelerometer sensor 150 nor the proximity sensor 160 is continuously started and operated to detect the acceleration of the mobile device 100 and the distance D between the mobile device 100 and an object based on energy considerations. In this embodiment, the accelerometer sensor 150 and the proximity sensor 160 are started only when the mobile device 100 has established a call connection. In addition, the accelerometer sensor 150 and the proximity sensor 160 can perform the detecting operations every time a fixed period of time is passed in order to save more power consumption. As implementations and detailed operations of the accelerometer sensor 150 and the proximity sensor 160 are already known to those skilled in the art, further description is omitted here for brevity.

In the following descriptions, several examples are taken for illustrating how the micro-processing unit 110 sets the call mode of the mobile device 100 according to at least the first judgment result DR1 and the second judgment result DR2.

In a first case, assume that the call mode of the mobile device 100 is set as the speaker mode in the beginning, that is, the second sound output device 186 is used for playing the audio signal AS1. When receiving an incoming call, the user answers the incoming call (i.e. to establish a call connection) and holds the mobile device 100 close to his ear. At this time, the accelerometer sensor 150 and the proximity sensor 160 are started after the mobile device 100 has established the call connection. Since the user holds the mobile device 100 close to his ear, the first judgment result DR1 outputted by the judgment unit 140 indicates that the acceleration of the mobile device 100 detected by the accelerometer sensor 150 changes and the second judgment result DR2 outputted by the judgment unit 140 indicates that the distance D between the mobile device 100 and the object detected by the proximity sensor 160 is smaller than a threshold TH1. In the meanwhile the micro-processing unit 110 switches the call mode of the mobile device 100 to the receiver mode from the speaker mode. That is, the first sound output device 184 is used to play the audio signal AS1.

In a second case, assume that the call mode of the mobile device 100 is set as the receiver mode in the beginning, that is, the first sound output device 184 is used for playing the audio signal AS1. When receiving an incoming call, the user answers the incoming call (i.e. to establish a call connection) and holds the mobile device 100 away from his ear. At this time, the accelerometer sensor 150 and the proximity sensor 160 are started after the mobile device 100 has established the call connection. Since the user holds the mobile device 100 away from his ear, the second judgment result DR2 outputted by the judgment unit 140 indicates that the distance D between the mobile device 100 and the object detected by the proximity sensor 160 is not smaller than a threshold TH1. In the meanwhile the micro-processing unit 110 switches the call mode of the mobile device 100 to the speaker mode from the receiver mode. That is, the second sound output device 186 is used to play the audio signal AS1.

As can be understood from the descriptions above, the micro-processing unit 110 can automatically switch the call mode of the mobile device 100 according to the acceleration of the mobile device 100 detected by the accelerometer sensor 150 and the distance between the mobile device 100 and the object detected by the proximity sensor 160. The user needs not to set the call mode of the mobile device 100 manually, and thereby the convenience of the mobile device 100 can be substantially improved. Furthermore, by adopting the mobile device 100 disclosed in the present disclosure, a user will not injure his ear caused by a sudden large volume outputted by the mobile device when he suddenly gets the mobile device 100 around the human ear under the speaker mode.

Figure 2:
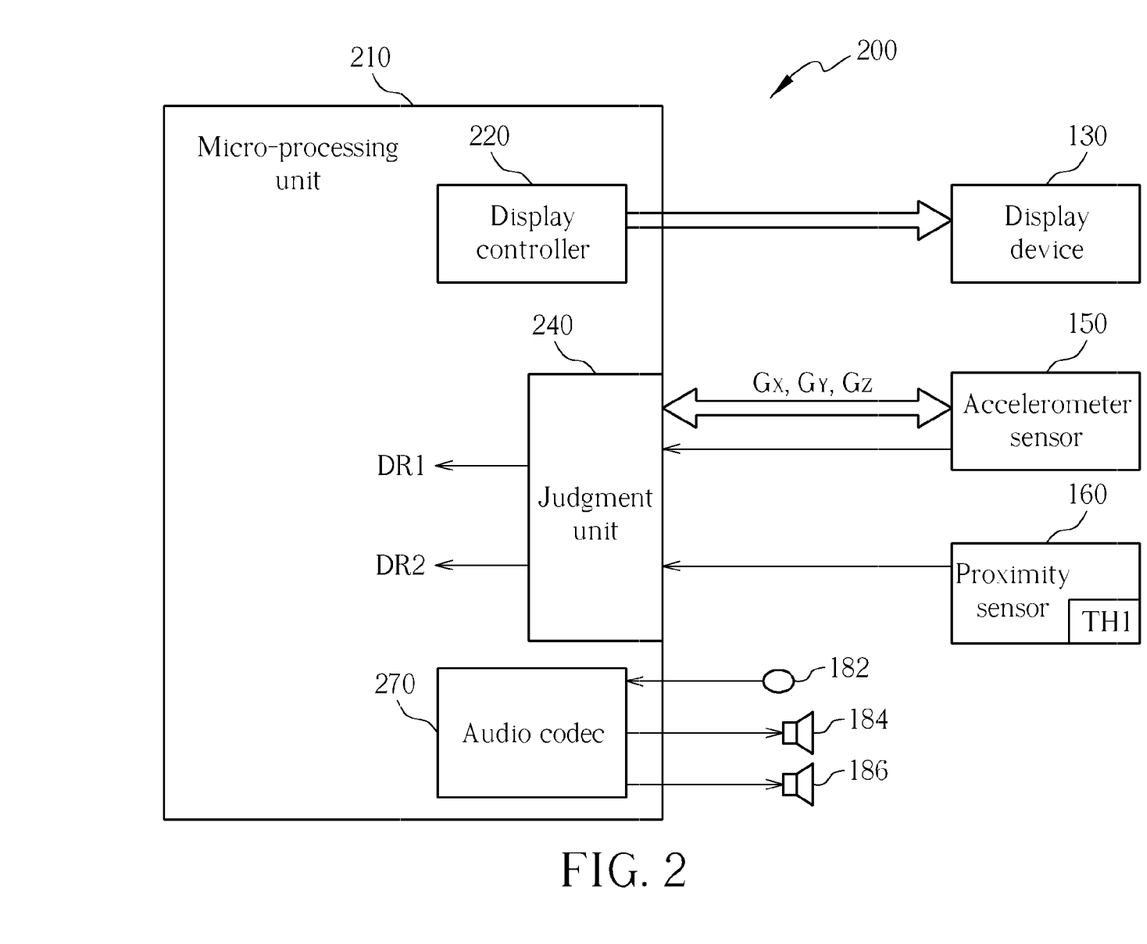
FIG. 2 is a diagram of a mobile device capable of automatically switching a call mode according to a second embodiment of the present disclosure.

Please refer to FIG. 2. FIG. 2 is a diagram of a mobile device 200 capable of automatically switching a call mode according to a second embodiment of the present disclosure. In FIG. 2, the architecture of the mobile device 200 is similar to that of the mobile device 100 shown in FIG. 1, and the difference between them is that a display controller 220, a judgment unit 240, and an audio codec 270 of the mobile device 200 are all disposed inside the micro-processing unit 210. In other words, the display controller 220, the judgment unit 240, the audio codec 270, and the micro-processing unit 210 are all integrated into an identical integrated circuit, which also belongs to the scope of the present invention.

Certainly, the abovementioned mobile devices 100 and 200 are presented merely to illustrate practicable embodiments of the present invention. In other embodiments, more functions can be designed to the micro-processing unit 110 or 210 and the judgment unit 140 or 240 in order to provide more choices to the mobile devices 100 and 200. For example, a current volume tuning function can be added, so that whether the object is close to or away from the mobile device can be determined according to the detected distance D between the mobile device and the object under the speaker mode, so as to determine how to adjust the current volume.

Figure 3:
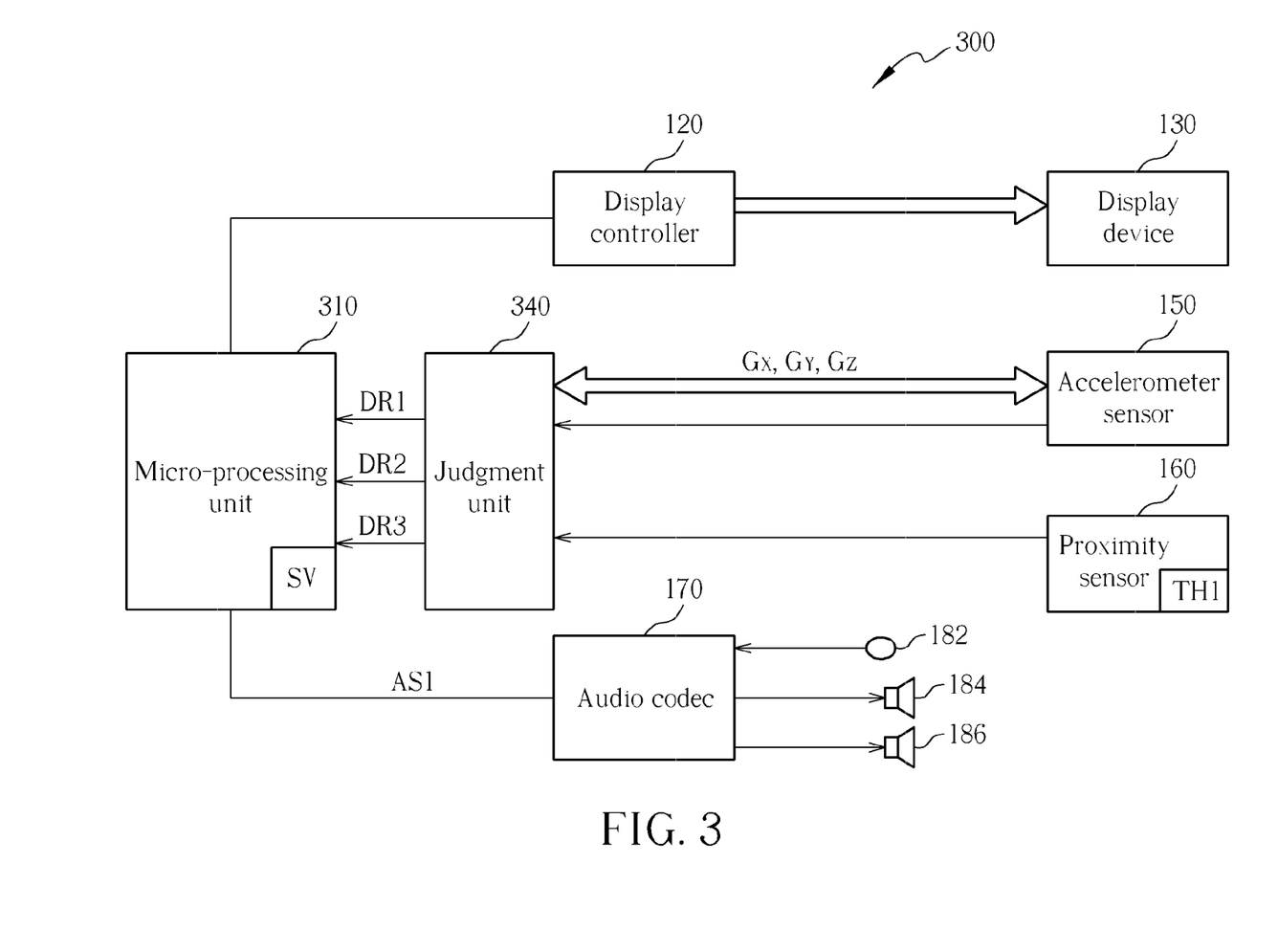
FIG. 3 is a diagram of a mobile device capable of automatically switching a call mode according to a third embodiment of the present disclosure.

Please refer to FIG. 3. FIG. 3 is a diagram of a mobile device 300 capable of automatically switching a call mode according to a third embodiment of the present disclosure. As shown in FIG. 3, when the judgment unit 340 judges that the distance D between the mobile device 300 and the object is not smaller than the threshold TH1, the judgment unit 340 further determines, according to the acceleration of the mobile device 300 detected by the accelerometer sensor 150, whether the object is close to or away from the mobile device 300 for generating a third judgment result DR3. At this time, the micro-processing unit 310 determines a current volume SV of the second sound output device 186 under the speaker mode according to the third judgment result DR3.

In the following descriptions, several examples are taken for illustrating how the micro-processing unit 310 as well as the judgment unit 340 adjust the current volume SV of the second sound output device 186 under the speaker mode according to the third judgment result DR3.

In a third case, assume that the call mode of the mobile device 300 is set as the speaker mode in the beginning, that is, the second sound output device 186 is used for playing the audio signal AS1, and the distance D between the mobile device 300 and the object is not smaller than the threshold TH1. Also assume that the object moves close to the mobile device 300, and the current volume SV of the second sound output device 186 is smaller than a first predetermined volume value SV1 (e.g. a minimum value). At this time, the judgment unit 340 determines, according to the acceleration of the mobile device 300 detected by the accelerometer sensor 150, whether the object is close to or away from the mobile device 300 for generating the third judgment result DR3 and transmitting the third judgment result DR3 to the micro-processing unit 310. Since the object moves close to the mobile device 300, the third judgment result DR3 indicates that the object is close to the mobile device 300. After the micro-processing unit 310 receives the third judgment result DR3, the micro-processing unit 310 determines whether the current volume SV of the second sound output device 186 is smaller than the first predetermined volume value SV1 to decide the current volume SV of the second sound output device 186. In this case, because the current volume SV of the second sound output device 186 is smaller than the first predetermined volume value SV1 (e.g. the minimum value), the micro-processing unit 310 keeps the current volume SV. In other words, the micro-processing unit 310 keeps the current volume SV at the minimum value.

In a fourth case, assume that the call mode of the mobile device 300 is set as the speaker mode in the beginning, and the distance D between the mobile device 300 and the object is not smaller than the threshold TH1. Also assume that the object moves close to the mobile device 300, and the current volume SV of the second sound output device 186 is not smaller than the first predetermined volume value SV1, that is, it is not the minimum value. At this time, the judgment unit 340 determines, according to the acceleration of the mobile device 300 detected by the accelerometer sensor 150, whether the object is close to or away from the mobile device 300 for generating the third judgment result DR3 and then transmitting the third judgment result DR3 to the micro-processing unit 310. Since the object moves close to the mobile device 300, the third judgment result DR3 indicates that the object is close to the mobile device 300. After the micro-processing unit 310 receives the third judgment result DR3, the micro-processing unit 310 determines whether the current volume SV of the second sound output device 186 is smaller than the first predetermined volume value SV1 so as to decide the current volume SV of the second sound output device 186. In this case, because the current volume SV of the second sound output device 186 is not smaller than the first predetermined volume value SV1, the micro-processing unit 310 lowers the current volume SV. In other words, the micro-processing unit 310 gradually lowers the current volume SV as the object moves close to the mobile device 300.

In a fifth case, assume that the call mode of the mobile device 300 is set as the speaker mode in the beginning, and the distance D between the mobile device 300 and the object is not smaller than the threshold TH1. Also assume that the object moves away from the mobile device 300, and the current volume SV of the second sound output device 186 is greater than a second predetermined volume value SV2 (e.g. a maximum value). At this time, the judgment unit 340 determines, according to the acceleration of the mobile device 300 detected by the accelerometer sensor 150, whether the object is close to or away from the mobile device 300 for generating the third judgment result DR3 and transmitting the third judgment result DR3 to the micro-processing unit 310. Since the object moves away from the mobile device 300, the third judgment result DR3 indicates that the object is away from the mobile device 300. After the micro-processing unit 310 receives the third judgment result DR3, the micro-processing unit 310 determines whether the current volume SV of the second sound output device 186 is greater than the second predetermined volume value SV2 so as to decide the current volume SV of the second sound output device 186. In this case, because the current volume SV of the second sound output device 186 is greater than the second predetermined volume value SV2 (e.g. the maximum value), the micro-processing unit 310 keeps the current volume SV. In other words, the micro-processing unit 310 keeps the current volume SV at the maximum value.

In a sixth case, assume that the call mode of the mobile device 300 is set as the speaker mode in the beginning, and the distance D between the mobile device 300 and the object is not smaller than the threshold TH1. Also assume that the object moves away from the mobile device 300, and the current volume SV of the second sound output device 186 is not greater than the second predetermined volume value SV2, that is, it is not the maximum value. At this time, the judgment unit 340 determines, according to the acceleration of the mobile device 300 detected by the accelerometer sensor 150, whether the object is close to or away from the mobile device 300 for generating the third judgment result DR3 and transmitting the third judgment result DR3 to the micro-processing unit 310. Since the object moves away from the mobile device 300, the third judgment result DR3 indicates that the object is away from the mobile device 300. After the micro-processing unit 310 receives the third judgment result DR3, the micro-processing unit 310 determines whether the current volume SV of the second sound output device 186 is greater than the second predetermined volume value SV2 to decide the current volume SV of the second sound output device 186. In this case, because the current volume SV of the second sound output device 186 is not greater than the second predetermined volume value SV2, the micro-processing unit 310 increases the current volume SV. In other words, the micro-processing unit 310 gradually increases the current volume SV as the object moves away from the mobile device 300.

As can be seen from abovementioned examples, the micro-processing unit 310 determines how to adjust the current volume SV next time according to the object moves close to or away from the mobile device 300 and the current volume SV. Therefore, a goal of automatically adjusting the output volume of the mobile phone with the distance D can be achieved, which can bring the user more convenience.

Figure 4:
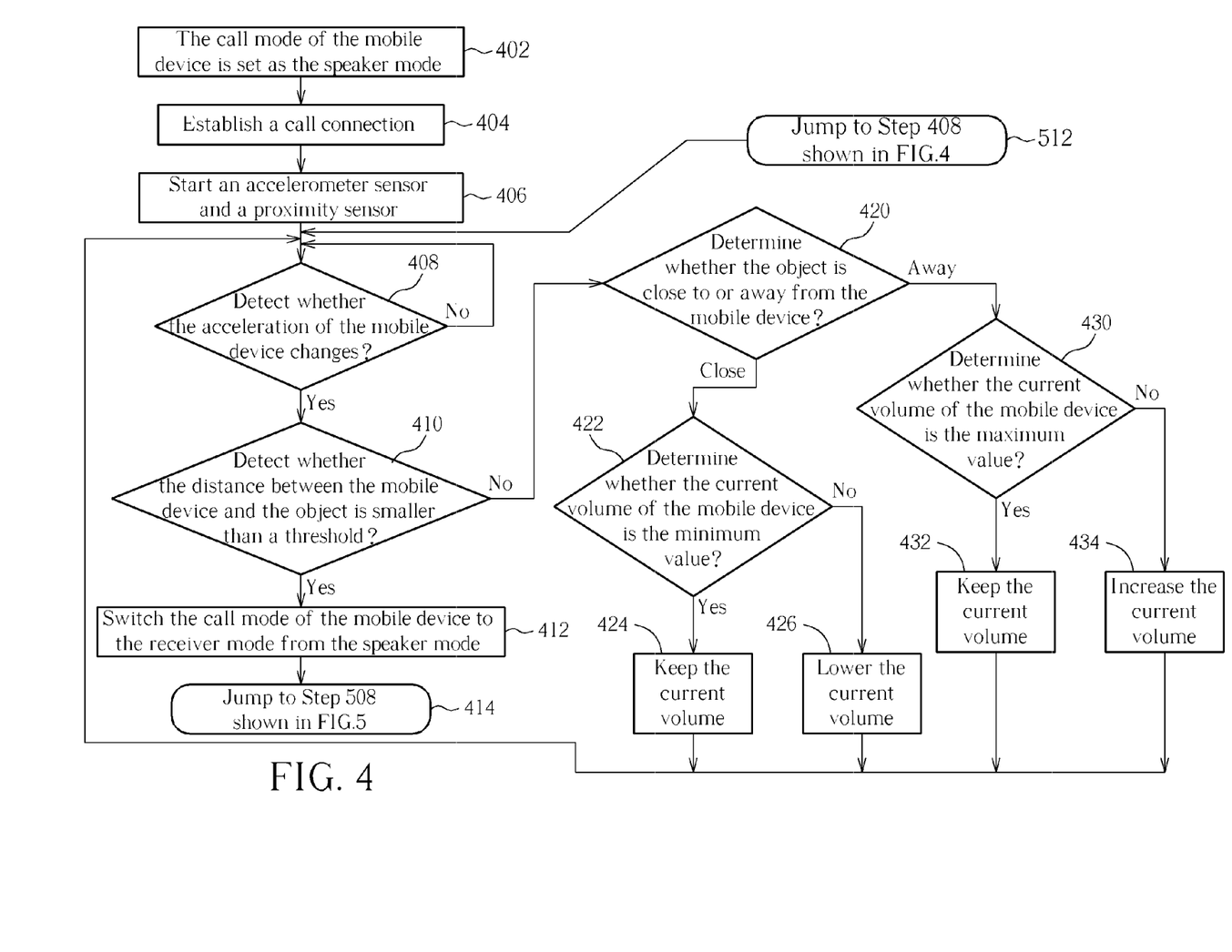
FIG. 4 is flowchart illustrating a method for switching a call mode of a mobile device according to an exemplary embodiment of the present disclosure.

Please refer to FIG. 4. FIG. 4 is flowchart illustrating a method for switching a call mode of a mobile device according to an exemplary embodiment of the present disclosure. Please note that the following steps are not limited to be performed according to the exact sequence shown in FIG. 4 if a roughly identical result can be obtained. The method includes, but is not limited to, the following steps:

Step 402: The call mode of the mobile device is set as the speaker mode.

Step 404: Establish a call connection.

Step 406: Start an accelerometer sensor to detect an acceleration of the mobile device, and start a proximity sensor to detect a distance between the mobile device and an object.

Step 408: Detect whether the detected acceleration of the mobile device changes for generating the first judgment result. When the first judgment result indicates that the acceleration of the mobile device changes, go to Step 410; otherwise, go back to Step 408.

Step 410: Detect whether the distance between the mobile device and the object is smaller than a threshold for generating the second judgment result. When the second judgment result indicates that the distance between the mobile device and the object is smaller than the threshold, go to Step 412; otherwise, go to Step 420.

Step 412: Switch the call mode of the mobile device to the receiver mode from the speaker mode.

Figure 5:
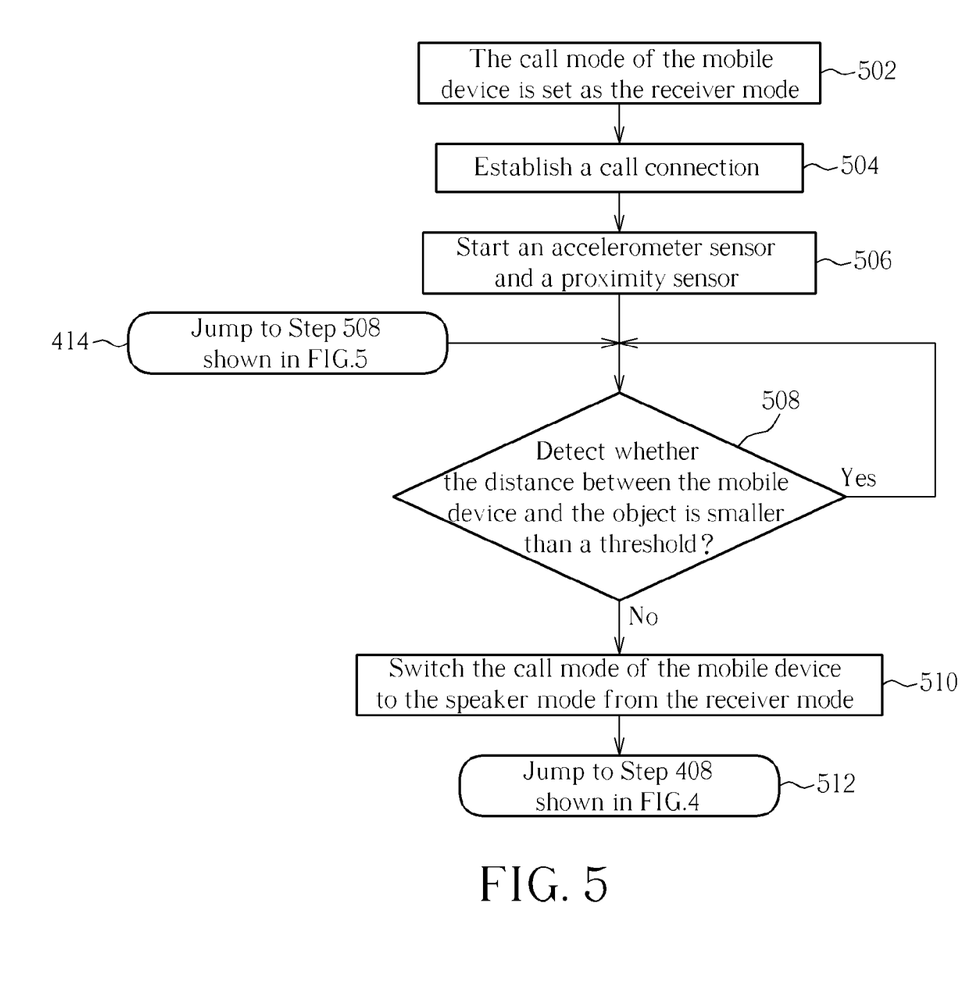
FIG. 5 is flowchart illustrating a method for switching a call mode of a mobile device according to another exemplary embodiment of the present disclosure.

Step 414: jump to Step 508 shown in FIG. 5.

Step 420: Determine, according to the acceleration detected by the accelerometer sensor, whether the object is close to or away from the mobile device for generating the third judgment result. When the third judgment result indicates that the object is close to the mobile device, go to Step 422; otherwise, go to Step 430.

Step 422: Determine whether the current volume of the mobile device is smaller than a first predetermined volume value (i.e. the minimum value). When the current volume of the mobile device is determined to be smaller than the first predetermined volume value, go to Step 424; otherwise, go to Step 426.

Step 424: Keep the current volume. Go back to Step 408.

Step 426: Lower the current volume. Go back to Step 408.

Step 430: Determine whether the current volume of the mobile device is greater than a second predetermined volume value (i.e. the maximum value). When the current volume of the mobile device is determined to be greater than the second predetermined volume value, go to Step 432; otherwise, go to Step 434.

Step 432: Keep the current volume. Go back to Step 408.

Step 434: Increase the current volume. Go back to Step 408.

How each element operates can be known by collocating the steps shown in FIG. 4 and the elements shown in FIG. 1 and FIG. 3, and further description is omitted here for brevity. Be noted that the operations of how the micro-processing unit 110 shown in FIG. 1 sets the call mode of the mobile device 100 according to at least the first judgment result DR1 and the second judgment result DR2 are represented by the steps 402-412. The operations of how the micro-processing unit 310 shown in FIG. 3 as well as the judgment unit 340 adjust the current volume SV of the second sound output device 186 under the speaker mode are represented by the steps 420-434. In addition, in the abovementioned first case, how the micro-processing unit 110 shown in FIG. 1 determines the time point of switching the call mode of the mobile device 100 to the receiver mode from the speaker mode is illustrated; in the abovementioned third, fourth, fifth, and sixth cases, how the micro-processing unit 310 shown in FIG. 3 as well as the judgment unit 340 adjust the current volume SV as the object moves close to or away from the mobile device 300 is illustrated.

Please refer to FIG. 5. FIG. 5 is flowchart illustrating a method for switching a call mode of a mobile device according to another exemplary embodiment of the present disclosure. The method includes, but is not limited to, the following steps:

Step 502: The call mode of the mobile device is set as the receiver mode.

Step 504: Establish a call connection.

Step 506: Start an accelerometer sensor to detect an acceleration of the mobile device, and start a proximity sensor to detect a distance between the mobile device and an object.

Step 508: Detect whether the distance between the mobile device and the object is smaller than a threshold for generating the second judgment result. When the second judgment result indicates that the distance between the mobile device and the object is smaller than the threshold, go back to Step 508; otherwise, go to Step 510.

Step 510: Switch the call mode of the mobile device to the speaker mode from the receiver mode.

Step 512: Jump to Step 408 shown in FIG. 4.

How each element operates can be known by collocating the steps shown in FIG. 5 and the elements shown in FIG. 1 or FIG. 2, and further description is omitted here for brevity. Furthermore, in the abovementioned second case, how the micro-processing unit 110 shown in FIG. 1 determines the time point of switching the call mode of the mobile device 100 to the speaker mode from the receiver mode is illustrated.

Please note that, the steps of the abovementioned flowcharts are merely practicable embodiments of the present invention, and in no way should be considered to be limitations of the scope of the present invention. The method can include other intermediate steps or several steps can be merged into a single step without departing from the spirit of the present invention.

Please also note that the flowcharts shown in FIG. 4 and FIG. 5 can be merged into a single flowchart. For example, Step 414 shown in FIG. 4 can be jumped to Step 508 shown in FIG. 5, and Step 512 shown in FIG. 5 can be jumped to Step 408 Shown in FIG. 4.

The abovementioned embodiments are presented merely for describing the present invention, and in no way should be considered to be limitations of the scope of the present invention. In summary, the present disclosure provides a mobile device capable of switching the call mode automatically and a method for switching the call mode of the mobile device. By starting an accelerometer sensor to detect an acceleration of the mobile device and by starting a proximity sensor to detect a distance between the mobile device and an object, the call mode of the mobile device can be automatically switched and the time point of switching the call mode of the mobile device can be determined. Therefore, the convenience of the mobile device can be substantially improved, and the user needs not to set the call mode of the mobile device manually. Furthermore, by adopting the mobile device 100 disclosed in the present disclosure, a user will not injure his ear caused by a sudden large volume outputted by the mobile device when he suddenly gets the mobile device 100 around the human ear under the speaker mode. In addition, the micro-processing unit as well as the judgment unit 340 can adjust the current volume SV of the mobile device under the speaker mode according to the judgment result of whether the object moves close to or away from the mobile device, which can provide more additional features to the mobile device.

Those skilled in the art will readily observe that numerous modifications and alterations of the device and method may be made while retaining the teachings of the invention.

What is claimed is:

1. A method for switching a call mode of a mobile device by a micro-processing unit, the call mode comprising a first mode using a first sound output device and a second mode using a second sound output device, comprising:
    starting an accelerometer sensor to detect an acceleration of the mobile device;
    starting a proximity sensor to detect a first distance between the mobile device and an object;
    generating a first judgment result according to the detected acceleration of the mobile device;
    generating a second judgment result according to the detected first distance between the mobile device and the object; and
    when it is determined the first distance is smaller than a first threshold, switching to the first mode;
    when it is determined the first distance is not smaller than the first threshold, switching to the second mode and setting the second sound output device at a predetermined volume;
    wherein in the second mode, detecting a second distance between the mobile device and the object; when the second distance indicates the object is moving further away from the mobile device above a second threshold, according to the detected acceleration by the accelerometer sensor, automatically increasing volume from the predetermined volume of the second sound output device gradually until a predetermined maximum volume is reached.

2. The method of claim 1, wherein the accelerometer sensor and the proximity sensor are started when the mobile device has established a call connection.

3. The method of claim 1, wherein the step of generating the first judgment result according to the detected acceleration of the mobile device comprises:
    determining whether the acceleration of the mobile device changes for generating the first judgment result;
    wherein the step of generating the second judgment result according to the detected first distance between the mobile device and the object comprises:
    detecting whether the first distance between the mobile device and the object is smaller than the first threshold for generating the second judgment result;
    wherein when the first judgment result indicates that the acceleration of the mobile device changes and the second judgment result indicates that the first distance between the mobile device and the object is smaller than the first threshold, determining to use the first sound output device to play an audio signal; and
    wherein when the second judgment result indicates that the first distance between the mobile device and the object is not smaller than the first threshold, determining to use the second sound output device to play the audio signal.

4. The method of claim 3, wherein
    when the second judgment result indicates that the first distance between the mobile device and the object is not smaller than the first threshold, determining, according to the acceleration detected by the accelerometer sensor, whether the object is close to or away from the mobile device for generating a third judgment result; and
    the method further comprises:
    determining a current volume of the second sound output device according to the third judgment result.

5. The method of claim 4, wherein in the second mode when the second distance is smaller than the second threshold, the method further comprises:
    determining whether the current volume of the second sound output device is smaller than a first predetermined volume value; and
    when the current volume of the second sound output device is determined to be smaller than the first predetermined volume value, keeping the current volume.

6. The method of claim 5, wherein when the current volume of the second sound output device is determined to be not smaller than the first predetermined volume value, the method further comprises lowering the current volume.

7. The method of claim 1, wherein in the second mode when the second distance is greater than the second threshold, the method further comprises:
    determining whether a current volume of the second sound output device is greater than a second predetermined volume value; and
    when the current volume of the second sound output device is determined to be greater than the second predetermined volume value, keeping the current volume.

8. The method of claim 7, wherein when the current volume of the second sound output device is determined to be not greater than the second predetermined volume value, the method further comprises increasing the current volume.

9. A mobile device capable of automatically switching a call mode by a micro-processing unit, the call mode comprising a first mode using a first sound output device and a second mode using a second sound output device, comprising:
    an accelerometer sensor, for detecting an acceleration of the mobile device;
    a proximity sensor, for detecting a first distance between the mobile device and an object;
    an audio codec, for processing an audio signal;
    the first sound output device, coupled to the audio codec;
    the second sound output device, coupled to the audio codec;
    the micro-processing unit, coupled to the first sound output device and the second sound output device; and
    a judgment unit for generating a first judgment result according to the detected acceleration of the mobile device and for generating a second judgment result according to the detected first distance between the mobile device and the object;
    wherein when the micro-processing unit determines the first distance is smaller than a first threshold, the micro-processing unit controls the call mode to switch to the first mode;
    wherein when the micro-processing unit determines the first distance is not smaller than the first threshold, the micro-processing unit controls the call mode to switch to the second mode and sets the second sound output device at a predetermined volume;
    wherein in the second mode, the proximity sensor detects a second distance between the mobile device and the object, and when the second distance indicates the object is moving further away from the mobile device above a second threshold, according to the detected acceleration by the accelerometer sensor, the micro-processing unit automatically increases volume from the predetermined volume of the second sound output device gradually until a predetermined maximum volume is reached.

10. The mobile device of claim 9, wherein the audio codec, the micro-processing unit, and the judgment unit are integrated into a single integrated circuit.

11. The mobile device of claim 9, wherein the accelerometer sensor and the proximity sensor are started by the micro-processing unit when the mobile device has established a call connection.

12. The mobile device of claim 9, wherein the first sound output device is a receiver and the second sound output device is a speaker.

13. The mobile device of claim 9, wherein in the second mode when the second distance is smaller than the second threshold, the micro-processing unit determines whether a current volume of the second sound output device is smaller than a first predetermined volume value; and when the current volume of the second sound output device is determined to be smaller than the first predetermined volume value, the micro-processing unit keeps the current volume.

14. The mobile device of claim 13, wherein when the current volume of the second sound output device is determined to be not smaller than the first predetermined volume value, the micro-processing unit lowers the current volume.

15. The mobile device of claim 9, wherein in the second mode when the second distance is greater than the second threshold, the micro-processing unit determines whether a current volume of the second sound output device is greater than a second predetermined volume value; and when the current volume of the second sound output device is determined to be greater than the second predetermined volume value, the micro-processing unit keeps the current volume.

16. The mobile device of claim 15, wherein when the current volume of the second sound output device is determined to be not greater than the second predetermined volume value, the micro-processing unit increases the current volume.

17. The mobile device of claim 9, wherein the mobile device is a mobile phone or a personal digital assistant (PDA).

* * * * *